April 26, 1966  A. L. WELLFORD  3,248,639
VOLTAGE REGULATED POWER CONVERSION SYSTEM
Filed Oct. 26, 1962
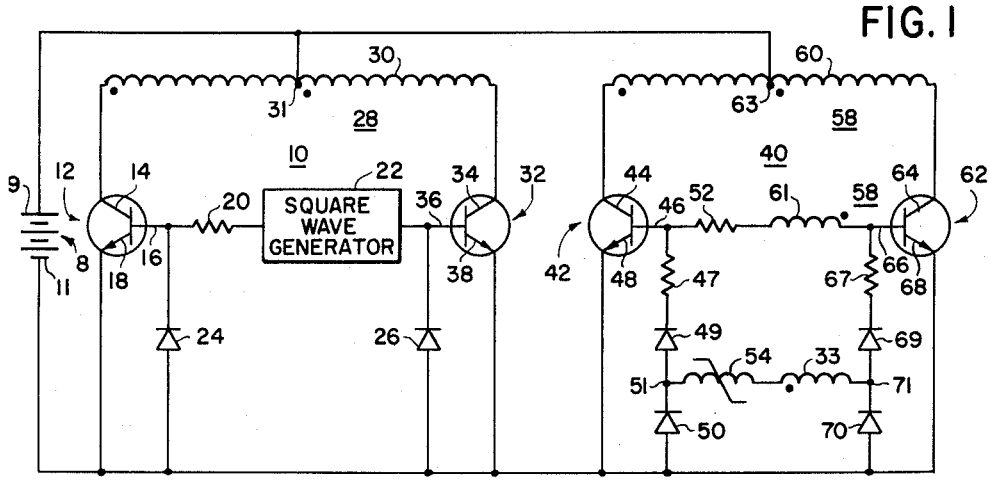
FIG. 1
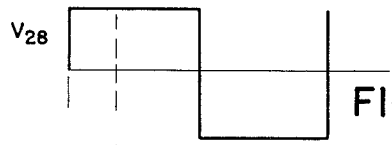
FIG. 3
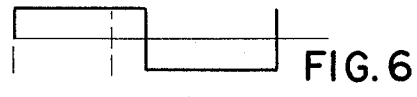
FIG. 6
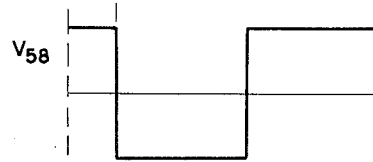
FIG. 4
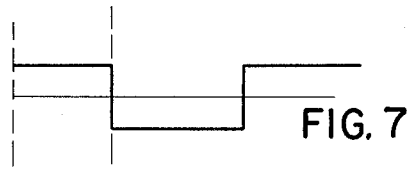
FIG. 7
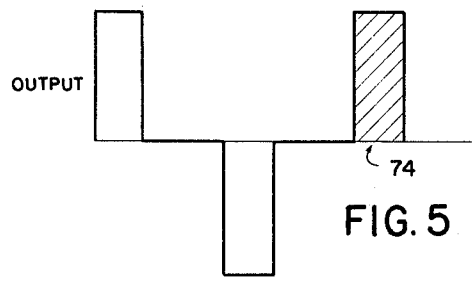
FIG. 5
FIG. 8
FIG. 2
INVENTOR.
ARMISTEAD L. WELLFORD
BY Isidore Match
ATTORNEY United States Patent Office 3,248,639
Patented Apr. 26, 1966

3,248,639
VOLTAGE REGULATED POWER CONVERSION SYSTEM
Armistead L. Wellford, Waynesboro, Va., assignor to General Electric Company, a corporation of New York
Filed Oct. 26, 1962, Ser. No. 233,347
5 Claims. (Cl. 321—27)

This invention relates to static inverters. More particularly, it relates to an improved inverter wherein output voltage regulation is readily and simply achieved.

In inverting arrangements wherein unidirectional power is converted to alternating current power such as in static inverters, D.C. to D.C. converters, frequency converters and the like, provision has to be made to regulate either the input or output voltage and, in many situations, there may be the need to regulate both. Voltage regulating schemes are generally quite complex, expensive, and where weight is a factor, may introduce an undesired increased weight into the power converting arrangement. Generally, such voltage regulating schemes are closed loop arrangements which require for their proper functioning a voltage reference, means for comparing the output voltage with this reference to generate an error voltage and means for utilizing the error voltage to effect regulation.

It is, accordingly, an important object of this invention to provide a power converting arrangement wherein voltage regulation is achieved in a simple manner.

It is another object to provide an arrangement in accordance with the preceding object wherein such voltage regulation is achieved inherently in the operation of the arrangement.

Generally speaking and in accordance with the invention, there is provided an arrangement for converting the power from a unidirectional potential source to alternating current power comprising a pair of oscillators, means for applying the output from the source to the oscillators and means coupling the oscillators to effect synchronous outputs therefrom. There are further provided means in circuit with the coupling means and one of the oscillators to effect an output from the last named oscillator which is displaced in phase from the output of the other oscillator an amount which is a function of the amplitude of the voltage from the source, and means for vectorially combining the outputs of the oscillators.

The features of this invention which are believed to be new are set forth with particularly in the appended claims. The invention itself, however, may best be understood by reference to the following description when taken in conjunction with the accompanying drawings which show an illustrative embodiment of a power conversion arrangement in accordance with the invention.

In the drawings, FIG. 1 is a schematic diagram of an illustrative embodiment of a power conversion arrangement in accordance with the principles of the invention;

FIG. 2 schematically depicts the means for obtaining the output from the arrangement of FIG. 1;

FIGS. 3, 4 and 5 comprise a timing diagram of waveforms produced in the arrangement of FIG. 1 and the means of FIG. 2; and FIGS. 6, 7 and 8 comprise a timing diagram similar to that shown in FIGS. 3, 4 and 5.

Referring now to FIG. 1, a transistor square wave oscillator 10 which is conveniently referred to as the "master" oscillator in the arrangement comprises a pair of transistors 12 and 32 whose collectors 14 and 34 respectively are interconnected through the primary winding 30 of a transformer 28. The midpoint 31 of primary winding 30 is connected to the positive terminal 9 of an unregulated unidirectional potential source 8 which is depicted as a battery in FIG. 1. The emitters 18 and 38 of transistors 12 and 32 respectively are directly connected to the negative terminal 11 of source 8. The bases 16 and 36 are returned to negative terminal 11 through the cathode to anode paths of diodes 24 and 26 respectively, diodes 24 and 26 serving to negatively clamp the voltages at the bases 16 and 36 to the voltage of negative terminal 11. Bases 16 and 36 are also interconnected by the series arrangement of a resistor 20 and a square wave generator 22. Generator 22 desirably has a relatively constant frequency output and suitably may be, for example, a magnetic coupled multivibrator which has an output frequency proportional to the supply voltage applied thereto, such supply voltage preferably being a regulated one.

The slave oscillator 40 comprises a pair of transistors 42 and 62 whose emitters 48 and 68 respectively are directly connected to negative terminal 11 and whose collectors are interconnected by the primary winding 60 of a transformer 58. The base 46 of transistor 42 is returned to negative terminal 11 through the series arrangement of a resistor 47, the cathode to anode path of a diode 49 and the cathode to anode path of a diode 50. The base 66 of transistor 62 is returned to negative terminal 11 through the series arrangement of a resistor 67, the cathode to anode path of a diode 69 and the cathode to anode path of a diode 70. Connected between bases 46 and 66 is the series arrangement of a resistor 52 and a secondary winding 61 of transformer 58 and connected between the junction 51 of diodes 49 and 50 and the junction 71 of diodes 69 and 70 is the series arrangement of a saturable reactor 54 and a secondary winding 33 of transformer 28. The midpoint of primary winding 63 is also connected to positive terminal 9. Diodes 50 and 70 serve to negatively clamp the voltages at junctions 51 and 71 to the voltage at negative terminal 11. The combinations of resistor 47 and diode 49 and resistor 67 and diode 69 respectively provide operating biasing potentials for bases 46 and 66.

In considering the operation of the arrangement of FIG. 1, it is seen that the action of square-wave generator 22 effects a square wave output on transformer 28, the polarity dots on the windings of transformer 28 indicating the terminals at which the same voltage polarities occur simultaneously. Secondary winding 33 of transformer 28 and secondary winding 61 of transformer 58 provide the base drive to transistors 42 and 62 in slave oscillator 40.

If it is assumed that the half cycle has just been initiated in which the output at collector 34 is negative going, the voltage polarity at the dot terminals of the windings of transformer 28 is positive. If it is further assumed that at this time, the voltages at the dot terminals of the windings of transformer 58 are positive, the voltage at collector 64 of transistor 62 is also negative going. Consequently, exciting current is supplied to saturable reactor 54 from the dot terminal of secondary winding 33, and thereafter through diodes 50 and 70 (current can flow "backward" through diode 50 by virtue of the greater forward current on which it is superimposed) to the non-dot terminal of winding 33. To understand this concept of superposition, let it be assumed that current is flowing into base 66 of transistor 62 through the series path which includes diodes 50 and 49 and resistor 47. Let it be further assumed that such current has a value of about 100 milliamperes. Now with the dot end of winding 33 of transformer 28 positive, exciting current flows from negative terminal 11 through diode 70, through saturable reactor 54 and then "backward" through diode 50. If the exciting current is assumed to have a value of 10 milliamperes, this means that, in reality, the forward current has been reduced from 100 to 90 milliamperes by virtue of the reverse current superimposed upon it. Effectively, during the timing interval of saturable reactor 54, junctions 51 and 71 are both at approximately the same potential, i.e., one diode voltage drop below the potential of negative terminal 11. Depending upon the volt-second characteristic of saturable reactor 54, it will saturate in a given interval and positive base drive will be supplied to transistor 42. Consequently, the voltages at the terminals of the windings of transformer 58 will reverse and transistor 42 will be supplied with positive base drive for a half cycle. When the voltages at the terminals of the windings of transformer 58 reverse and during the half cycle of output from transistor 42, saturable reactor 54 is driven toward saturation in the opposite direction and when it saturates in such opposite direction, the voltage polarities at the terminals of the windings of transformer 58 will again reverse to initiate the next half cycle of output from slave oscillator 40. FIG. 2 shows the series arrangement of secondary windings 35 and 65 of transformers 28 and 58 for phasorially combining the voltages appearing thereon in the polarities as shown therein.

The waveform of FIG. 3 shows the voltage appearing on transformer 28, specifically secondary winding 35 and the waveform of FIG. 4 shows the voltage appearing on transformer 58, specifically secondary winding 65. If voltages, on windings 35 and 65 are now vectorially added as shown in FIG. 2, the waveform of FIG. 5 results. This resulting waveform is a quasi-square wave having a given amplitude and a given dwell angle.

If it is assumed that the waveforms of FIGS. 3, 4 and 5 indicate that the voltage from source 8 is "high," then reactor 54 will saturate comparatively rapidly and short but high amplitude output pulses result. The waveforms of FIGS. 6, 7 and 8 correspondingly show the situation when the input voltage is "low" from source 8, these waveforms also showing the output voltages in transformers 28 and 58 and the voltage resulting from their vectorial addition. In the case of the waveforms of FIGS. 6, 7 and 8, saturable reactor 54 saturates more slowly and acordingly, the output pulses may be longer but of lesser amplitude, the waveform of FIG. 8 approaching that of a complete square wave.

However, in either case the respective volt-second contents of these pulses is constant. Thus, pulses 74 and 76 are of different amplitudes and widths but their areas are equal. The volt-second content of the pulses are also proportional to the volt-second characteristic of saturable reactor 54 through the turn ratios of the respective primary to secondary windings in transformers 28 and 58. The desired output voltage may be adjusted as desired by taps either on saturable reactor 54 or on winding 33.

While there has been described what is considered to be the preferred embodiment of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. An arrangement for converting the power from a unidirectional potential source to alternating current power comprising a pair of oscillators, means for applying the output from said source to said oscillators, means coupling said oscillators to effect synchronous outputs therefrom, means in circuit with said coupling means and one of said oscillators and responsive to variations in amplitude of the potential from said source to effect an output from said one oscillator which is displaced in phase from the output of the other oscillator an amount which is a function of the amplitude of said source potential, and means for vectorially combining the outputs of said oscillators.

2. An arrangement for converting the power from a unidirectional potential source to alternating current power comprising a pair of square wave oscillators, means for applying the output from said source to produce outputs therefrom having amplitudes commensurate with amplitude of said source output, means coupling said oscillators to produce synchronous outputs therefrom, a saturable device having a given volt-second characteristic and in circuit with one of said oscillators and said coupling means, said saturable device being responsive to variation in amplitude of the potential from said source to effect an output from said one oscillator which is displaced in phase with respect to the output of said other oscillator an amount which is proportional to the amplitude of said source potential, and means for vectorially combining the outputs of said oscillators.

3. An arrangement for converting the power from a unidirectional potential source to alternating current power comprising a first square wave oscillators having a first output transformer, said first transformer having a first primary winding and a plurality of first secondary windings, a square wave generator coupled to said first oscillator for supplying drive thereto, a second squarewave oscillator having a second output tarnsformer, said second output transformer having a second primary winding and a plurality of second secondary windings, one of said first secondary windings coupling said generators to provide drive to said second oscillator whereby synchronous outputs are produced from said oscillators, a saturable device having a given volt-second characteristic in circuit with said one first secondary winding and said second oscillator and responsive to variations in amplitude of the potential from said source for effecting an output from said second generator which is displaced in phase with respect to the output from said first oscillator an amount which is proportional to the amplitude of the potential from said source, and means for vectorially combining the outputs of said oscillators comprising means for vectorially combining the outputs from a second one of said first secondary windings and a second one of said second secondary windings.

4. An arrangement as defined in claim 3 wherein said means for vectorially combining said outputs from said oscillators comprises a series arrangement of one of said first and second secondary windings.

5. An arrangement as defined in claim 3 wherein said including one of said second secondary windings operative to also supply drive to said second oscillator.

References Cited by the Examiner
UNITED STATES PATENTS

| | | | |
|---|---|---|---|
| 2,855,561 | 10/1958 | Steinitz | 321—36 |
| 3,002,142 | 9/1961 | Jensen | 331—113.1 |
| 3,010,062 | 11/1961 | Van Emden | 321—45 |
| 3,026,484 | 3/1962 | Bennett et al. | 331—113.1 |
| 3,031,629 | 4/1962 | Kardi | 331—113.1 |

LLOYD McCOLLUM, *Primary Examiner.*

G. J. BUDOCK, G. GOLDBERG, *Assistant Examiners.*